United States Patent
Sakai et al.

[11] Patent Number: 5,944,186
[45] Date of Patent: Aug. 31, 1999

[54] ROLL-LIKE PHOTOSENSITIVE MATERIAL PACKING BODY

[75] Inventors: Shigekazu Sakai; Manabu Watanabe; Manabu Toyonaga, all of Hino, Japan

[73] Assignee: Konica Corporation, Japan

[21] Appl. No.: 09/067,419

[22] Filed: Apr. 28, 1998

[30] Foreign Application Priority Data

May 7, 1997 [JP] Japan ................................. 9-117007

[51] Int. Cl.$^6$ ................................. B65D 85/66
[52] U.S. Cl. ................ 206/397; 206/455; 206/414
[58] Field of Search ........................ 206/455, 390, 206/397, 407, 408, 409, 411, 415, 416, 413, 414, 398; 396/512, 513

[56] References Cited

U.S. PATENT DOCUMENTS

| | | |
|---|---|---|
| 4,148,398 | 4/1979 | Syracuse et al. . |
| 4,505,387 | 3/1985 | Seto . |
| 5,472,089 | 12/1995 | Specogna et al. ............ 206/413 |
| 5,492,221 | 2/1996 | Light et al. .................. 206/398 |
| 5,655,659 | 8/1997 | Kennedy ..................... 206/455 |

FOREIGN PATENT DOCUMENTS 0632322   5/1994   European Pat. Off. .

*Primary Examiner*—Paul T. Sewell
*Assistant Examiner*—Nhan T. Lam
*Attorney, Agent, or Firm*—Jordan B. Bierman; Bierman, Muserlian and Lucas

[57] ABSTRACT

In a roll photosensitive material package composed of a roll photosensitive material scroll and a light shielding side member provided to each side of the roll photosensitive material scroll, the light shielding side member has a surplus portion projecting from the outer circumferential surface of the roll photosensitive material scroll, and the surplus portion is bent at the edge of the outer circumferential surface, folded at plural points and superimposed on the outer circumferential surface. The folded superimposed sections 0 of the surplus portion are composed of peak creases and bottom creases, the peak creases are superimposed around the bottom creases and the folded superimposed sections are provided with a substantially equal pitch, and a direction of each bottom crease has an inclination angle $\alpha$ to the axis of the core, when the peak creases are superimposed around the bottom creases, a direction of each peak crease has an inclination angle $\beta$ to the axis of the core, and the inclination angle $\beta$ is smaller than the inclination angle $\alpha$.

11 Claims, 14 Drawing Sheets

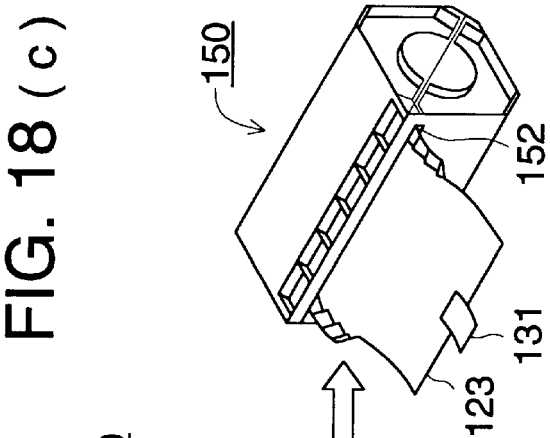
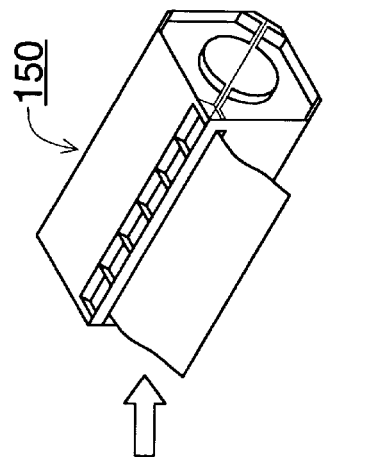
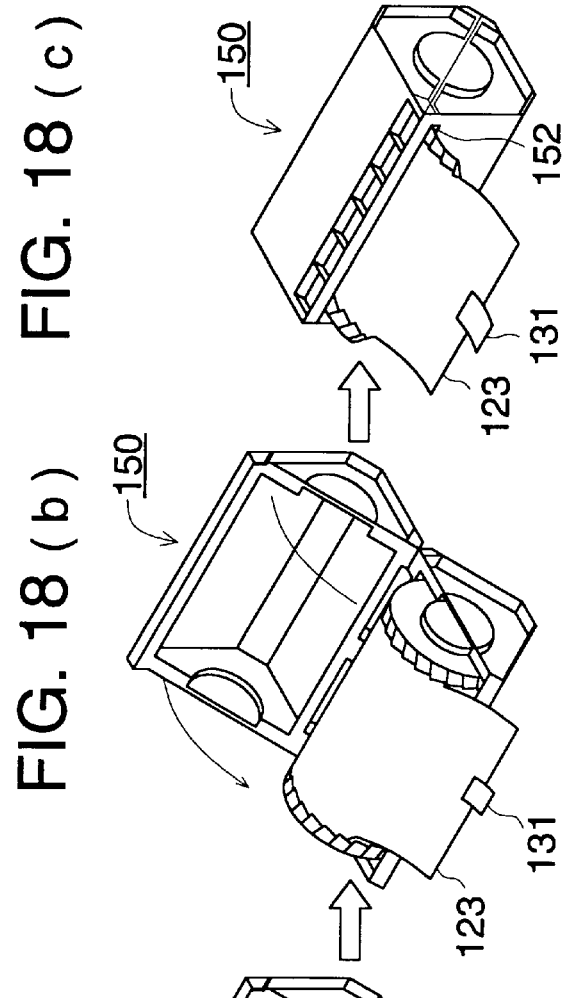
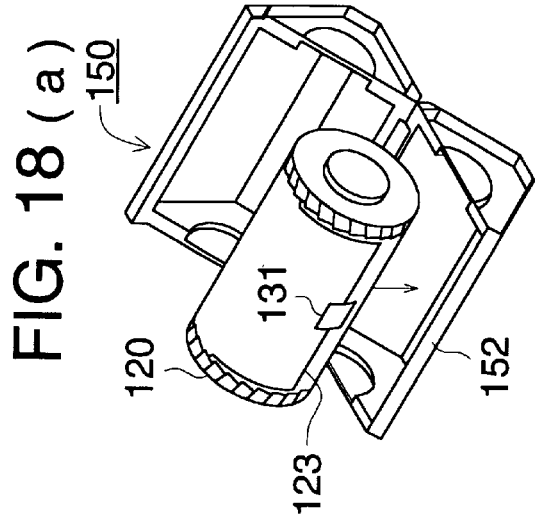
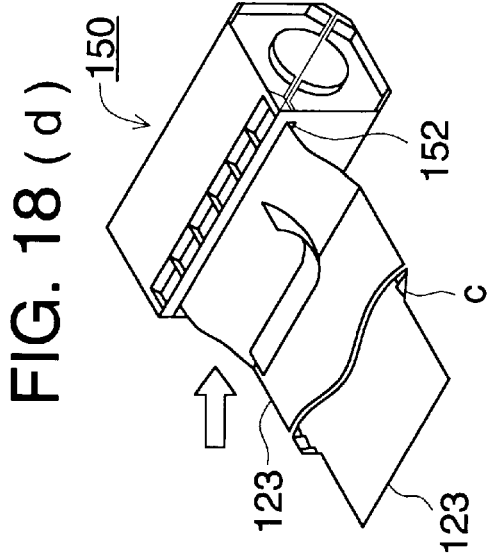

ROLL-LIKE PHOTOSENSITIVE MATERIAL PACKING BODY

BACKGROUND OF THE INVENTION

The present invention relates to a roll-like photosensitive material packing body (a roll photosensitive material packing body) used for so-called bright room loading.

The roll photosensitive material packing body used for bright room loading is structured such that, for example, the roll photosensitive material is loaded in a magazine or the like, while its light tightness is maintained, and at first exposure, the light tightness is broken in the magazine, and web of the photosensitive material is pulled out from a slit (opening portion) formed in the magazine.

Conventionally, as such a roll photosensitive material packing body, a packing body 20 for roll photosensitive material as shown in FIGS. 19(a) and (b) is disclosed in, for example, Japanese Patent Publication No. 38582/1989. The packing body 20 is composed of roll like photosensitive material 4 in which photosensitive material web 1 is wound around a cylindrical core and which is formed into a roll; disk-like light tight side plates 5 provided on both flat end surfaces 3 of the roll photosensitive material; a belt-like leader 7 jointed to the end of the photosensitive material web 1; and a belt-like light tight cover 6 which covers the outer peripheral surface of the roll photosensitive material 4. The light tight cover 6 is wider than the photosensitive material web 1 and the leader 7, and when it covers the outer peripheral surface of the roll photosensitive material 4, both end portions 8 project in the width direction of the roll photosensitive material 4, and a plurality of slits 9 are provided on its both side ends 8.

On the other hand, other than the above packing body 20, as another example of the conventional packing body, a packing body 30 shown in FIGS. 20(a) and (b), as disclosed in Japanese Utility Model Publication No. 16608/1981, is widely known. The packing body 30 is different from the above-described packing body 20 in the following structural points, and other portions are the same as the above packing body 20: a light tight leader 12 with the light tightness is used instead of the light tight cover 6 used for the above packing body 20; as a light tight means of the end surfaces of the roll photosensitive material, a disk-like end surface cover 15 whose diameter is larger than that of the both end surfaces 14 of the roll photosensitive material 13 and on whose peripheral portion 16 slits 17 are provided, are used for both end surfaces 14; and the peripheral portion 16 on which slits 17 are provided, is bent and cemented along the outer peripheral surface near end portions of the roll photosensitive material 13.

Further, other than the packing bodies 20 and 30, as another example of the conventional packing body, a packing body 40 shown in FIG. 21 is disclosed in Japanese Patent Publication Open to Public Inspection No. 6290/1994. The packing body 40, different from the above-described packing body 30, has no slit on the peripheral portion of the disk-like end surface cover 24, and the disk-like end surface cover 24 is bent and folded along the outer peripheral surface near the end portions of the roll photosensitive material, and is cemented on the outer peripheral surface of the roll photosensitive material.

However, in the conventional packing body 20, when the beginning of the slit 9 coincides with the side end portion of the leader 7, or it is inside the side end portion of the leader 7, there is a possibility that light penetrates from the slit 9 so that the photosensitive material web 1 is fogged, and reversely, when the beginning of the slit 9 is separated too far from the end portion of the leader 7, an effect of cutting is lost. Accordingly, at the production of the packing body 20, adjustment of the positional relationship of the beginning of a plurality of slits 9 formed on both side end portions 8 and the end portion of the leader 7 is very difficult, and in order to process it so that the light does not leak into the inside from the slit, very troublesome operations are necessary in the dimensional adjustment, resulting in an increase of production cost of the packing body 20.

On the other hand, slits 17 formed on the peripheral portions 16 of the both side disk-like end portion covers 15, which are one essential component of the above packing body 30, should be formed so as not to reach the end surface of the roll photosensitive material 13, and therefore, it is necessary that the slits 17 are previously formed by being adjusted to the outer diameter of the roll photosensitive material 13. However, the outer diameter of the roll photosensitive material 13 varies depending on the thickness of the photosensitive material web, winding strength, etc., and therefore, determination of the positions of the slits 17 is also very difficult.

Further, in the packing body 40, it is difficult to obtain the stability to light tightness of the folded portion, and the light enters from the portion into the inside of the packing body, so that the housed photosensitive material is fogged, which is a serious problem.

SUMMARY OF THE INVENTION

The present invention is considered to solve the above-described problems, and thee object of the present invention is to provide a packing body of roll photosensitive material whose production is very easy, and by which an assured light tight condition can be obtained and packing cost can be reduced.

The object can be attained by any one of the following technological means (1) to (14).

(1) A roll photosensitive material packing body comprising a roll photosensitive material scroll around which a light tight leader, which is jointed to the leading edge of the roll photosensitive material wound around a winding core, and light-shields the outer peripheral surface of the photosensitive material, is further wound; side surface light tight members which light-shield both side surfaces of the roll photosensitive material scroll, and are almost concentrically fixed with respect to the winding core, in which the outer diameter of the side surface light tight members is larger than that of the roll photosensitive material scroll, and a portion lager than the outer diameter of the roll photosensitive material scroll is bent along the outer peripheral surface at the outer peripheral edge portion of the roll photosensitive material scroll; the surplus portion on the outer peripheral surface of the roll photosensitive material scroll is folded at plural portions and covers the portions; and folded portions are composed of creases of peaks and bottoms, and the crease of the peak is laid on the upper side of the crease of the bottom and folded on it, and the folded portions are provided on the outer peripheral surface of the roll photosensitive material scroll at almost equal interval; the direction of the crease of the bottom has an inclination angle $\alpha$ with respect to the direction of the winding core axis; and the crease of the peak is laid in the direction in which an inclination angle $\beta$ of the crease of the peak with respect to the direction of the winding core axis when the crease of the peak is laid around the crease of the bottom, is smaller than the inclination angle $\alpha$.

(2) In Item (1), the roll photosensitive material packing body written in Item (1) characterized in that creases of the folded portions provided at a plurality of portions are sequentially structured in the order of the bottom and the peak or the peak and the bottom on the outer peripheral surface of the roll photosensitive material scroll.

(3) In Item (1), the roll photosensitive material packing body written in Item (1) characterized in that creases of the folded portions provided at the plurality of portions are sequentially structured in the order of the bottom and the peak or the peak and the bottom except one remaining crease on the outer peripheral surface of the roll photosensitive material scroll, and the one remaining crease is reversely structured in the order of the peak and the bottom or the bottom and the peak.

(4) In Item (1), the roll photosensitive material packing body written in Item (1) characterized in that the sequentially adjoining portions in the creases of the folded portions provided at the plurality of portions are structured in the order of the bottom, peak, peak, and bottom, or the peak, bottom, bottom, and peak on th_outer peripheral surface of the roll photosensitive material scroll.

(5) The roll photosensitive material packing body written in any one of items (1) to (4) characterized in that the inclination angle α at which the crease of the bottom is inclined with respect to the direction of the axis of the winding core is 20–70° on the outer peripheral surface of the roll photosensitive material scroll.

(6) The roll photosensitive material packing body written in any one of Items (1) to (5) characterized in that the outer diameter of the side surface light tight member is larger than that of the roll photosensitive material scroll, and the side surface light tight member is structured by a label member having an adhesive layer; and the label member and a back padding member whose outer diameter is larger than that of the roll photosensitive material scroll and smaller than that of the label member, are adhered to each other through the adhesive layer.

(7) The roll photosensitive material packing body written in any one of Items (1) to (6) characterized in that the side surface light tight member has an aluminium evaporation layer.

(8) The roll photosensitive material packing body written in any one of Items (1) to (6) characterized in that the side surface light tight member has a layer formed of biaxially stretched polyester resin material or synthetic paper having biaxially stretched layer.

(9) The roll photosensitive material packing body written in any one of Items (1) to (8) characterized in that gear-like notches are formed on the outer peripheral portion of the side surface light tight member.

(10) The roll photosensitive material packing body written in Item (9) characterized in that an angle θ of the bottom portion, structured between the peaks of the notches, formed with respect to the peaks, is 5–90°.

(11) In a production method of the roll photosensitive material packing body written in Item (4), a production method of the roll photosensitive material packing body characterized in that the side surface light tight members are almost concentrically, with respect to the winding core, fixed on both side surfaces of a roll photosensitive material scroll around which a light tight leader is further wound, in which the light tight leader is jointed to the leading edge of the roll photosensitive material wound around the winding core, and light-shields the outer peripheral surface of the photosensitive material; the first block to bend a portion of the side surface light tight member whose outer diameter is larger than that of the roll photosensitive material scroll, along the outer peripheral surface at the edge portion of the outer periphery of the roll photosensitive material scroll, is arranged, and when the first block is moved along the outer peripheral surface of the roll photosensitive material scroll in the direction of the winding core axis or in the direction of outer peripheral surface of the roll photosensitive material scroll, a crease portion is formed between creases of 2 bottoms; the second block is arranged which forms the inner peripheral surface whose inner diameter is the same as that of the first block, so that rising portions which exist between adjoining crease portions and have an equal interval, are bent; and when the second block is moved in the direction of the winding core axis or in the direction of outer peripheral surface of the roll photosensitive material scroll, a crease portion is formed between creases of 2 peaks of the side surface light tight member.

(12) In a production method of the roll photosensitive material packing body written in Item (4), a production method of the roll photosensitive material packing body characterized in that the side surface light tight members are almost concentrically, with respect to the winding core, fixed on both side surfaces of a roll photosensitive material scroll around which a light tight leader is further wound, in which the light tight leader is jointed to the leading edge of the roll photosensitive material wound around the winding core, and light-shields the outer peripheral surface of the photosensitive material; the first cylindrical body is formed in which the first blocks are arranged on the circumference of the circle at an almost equal pitch, wherein the first block bends a portion of the side surface light tight member whose outer diameter is larger than that of the roll photosensitive material scroll, along the outer peripheral surface at the edge portion of the outer periphery of the roll photosensitive material scroll, and forms the inner peripheral surface whose inner diameter is equal to the outer diameter of the outer peripheral surface of the roll photosensitive material scroll; when the first cylindrical body is moved along the outer peripheral surface of the roll photosensitive material scroll in the direction of the winding core axis or in the direction of outer peripheral surface of the roll photosensitive material scroll, a crease portion is formed between creases of 2 bottoms; the second cylindrical body is formed in which the second blocks are arranged on the circumference of the circle at an almost equal pitch, wherein the second block has the inner peripheral surface whose inner diameter is the same as that of the first block, so that rising portions which exist between adjoining crease portions and have an equal interval, are bent; and when the second cylindrical body is moved in the direction of the winding core axis or in the direction of outer peripheral surface of the roll photosensitive material scroll in the same manner as the first cylindrical body, a crease portion is formed between creases of 2 peaks of the side surface light tight member.

(13) The production method of the roll photosensitive material packing body written in Item (12) characterized in that one cylindrical body is structured such that the first block and the second block are shifted by ½ pitch, and are arranged vertically.

(14) In a production method of the roll photosensitive material packing body written in Item (4), a production method of the roll photosensitive material packing body characterized in that the side surface light tight members are almost concentrically, with respect to the winding core, fixed on both side surfaces of a roll photosensitive material scroll around which a light tight leader is further wound, in which the light tight leader is jointed to the leading edge of the roll photosensitive material wound around the winding core, and light-shields the outer peripheral surface of the photosensitive material; the first cylindrical body is formed in which the first blocks are arranged on the circumference of the circle at an almost equal pitch, wherein the first block bends a portion of the side surface light tight member whose outer diameter is larger than that of the roll photosensitive material scroll, along the outer peripheral surface at the edge portion of the outer periphery of the roll photosensitive material scroll, and forms the inner peripheral surface whose inner diameter is equal to the outer diameter of the outer peripheral surface of the roll photosensitive material scroll; when the first cylindrical body is moved along the outer peripheral surface of the roll photosensitive material scroll in the direction of the winding core axis or in the direction of outer peripheral surface of the roll photosensitive material scroll, a crease portion is formed between creases of 2 bottoms; when the first cylindrical body is rotated in the direction of circumference by a half of the pitch between blocks, and is moved in the direction of the winding core axis or in the direction of outer peripheral surface of the roll photosensitive material scroll, rising portions which exist between the creases and have an equal interval, are bent, and a crease portion is formed between 2 creases of the peaks of the side surface light tight member.

BRIEF DESCRIPTION OF THE DRAWINGS

FIGS. 18(a) to 18(e) are perspective views showing a condition under which the roll photosensitive material packing body of the present invention is loaded in a magazine.

DETAILED DESCRIPTION OF THE PREFERRED EMBODIMENT

Referring to the attached drawings, an example of the embodiment of the present invention will be detailed below.

Figure 1:
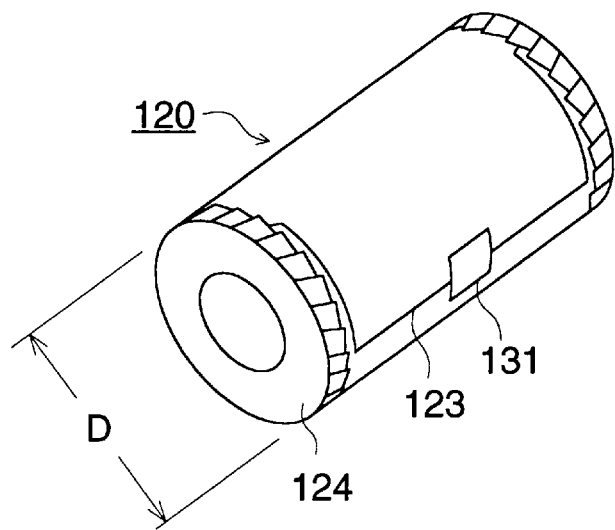
FIG. 1 is a perspective view showing an example of a roll photosensitive material packing body of the present invention.
Figure 2:
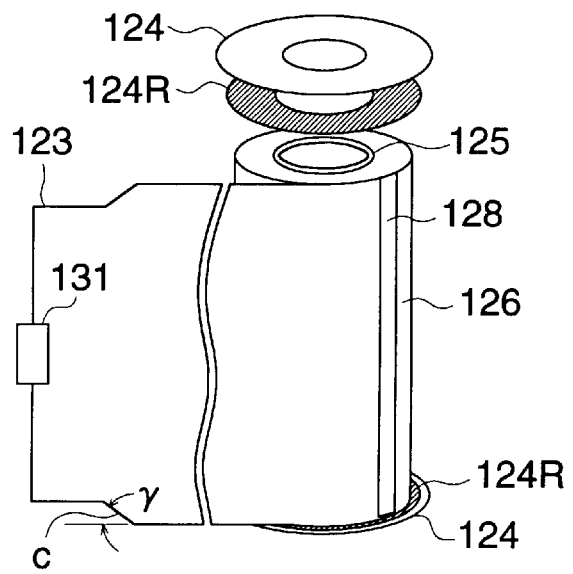
FIG. 2 is an exploded perspective view showing an example of a roll photosensitive material scroll used in the present invention.

FIGS. 1 and 2 are perspective views showing an example of an embodiment of a roll photosensitive material packing body 120 according to the present invention. The packing body 120 is composed of a roll photosensitive material 122, a belt-like light tight leader 123 which covers and light-shields the outer peripheral surface of the roll photosensitive material 122, and 2 side surface light tight members 124 which covers and light-shields both side surfaces of the roll photosensitive material 122.

The roll photosensitive material 122 is made such that a photosensitive material web 126 is wound around the outer peripheral surface of a winding core 125 and is wound up roll. As the photosensitive material web 126, ordinary photographic film, for example, color negative film, color paper, and printing film, paper, etc., may be used. Material of the winding core 125 is not specifically limited, however, paper is preferably used as base material, or alternatively, the overall winding core 125 may be structured by only resin. The inner diameter of the winding core 125 is the inner diameter corresponding to a printer to be used. The length of the winding core 125, that is, the length in the width direction of the photosensitive material web 126 is preferably the same as the width of the photosensitive material web 126 or slightly shorter than that.

The winding core 125 is generally structured such that belt-like matter is coiled and hardened, and further light tightness is added. In that case, when a few turns of thermoplastic resin layer of polyethylene or the like are formed in the winding layer, because the adhesion property to the side surface light tight member 124 is increased, it is preferable.

Because the side surface light tight member 124 is fixed on the end surfaces of the winding core 125, the thickness of the winding core is preferably 2–10 mm, and more preferably 5–7 mm.

In the light tight leader 123, its width is the same as that of photosensitive material web 126 or slightly narrower, its length is the same as the outer periphery of the roll photosensitive material 122, or longer than that, and its one end is jointed to the end portion of the photosensitive material web 126 which is wound around the winding core 125, by a splice tape 128. Further, it may be jointed by using ultrasonic fusing. On the other hand, on the other end of the light tight leader 123, a cutout portion is provided whose width is gradually narrowed from both side ends near the other end to the leading edge of the other end. By winding the light shielding leader 123, light other than light coming from the outer circumferential surface of the roll photosensitive material can be shielded. It is preferable that the cutout portion is linear, and an angle γ formed with respect to the edge of the light tight leader is preferably 30–60°, and most preferably 45°. The other end of the light tight leader 123 is fixed, as shown in FIG. 1, on the outer peripheral surface of the light tight leader 123 by an adhesive tape as an end tape 131, and anti-loosing is provided. Design may be made on the end tape 131. The light tight leader 123 protects the photosensitive material web 126 from light, humidity, dusts, etc. When the packing film material constituting the light tight leader 123 has excellent light tightness, moisture tightness, and physical strength (hardly torn off, or the like), and does not have a bad influence such as fogging or similar influence, upon lightsensitive emulsion on the photosensitive material, it is not specifically limited, but various types of packing film material may be used. Further, it is more preferable that the packing film material has a nature, in addition to the above nature, in which one surface is easily thermally adhered, and the other surface is hardly thermally adhered. Concretely, light tight polyethylene film including carbon black, or lamination film in which light tight polyethylene film including carbon black, paper, polyester, aluminum foil, etc., are combined with and adhered to each other, is preferable. Further, the total thickness of the light tight leader 123 is preferably 100–200 μm.

The side surface light tight member 124 is a thin donut-shaped disk material in which a hole is formed at the center. The inner diameter of the side surface light tight member 124 is formed to be the same as that of the winding core 125 or slightly lager than it, or is formed to be the same as the outer diameter of the core or smaller than it, and the outer diameter is 10–50 mm larger than that of the roll photosensitive material 122, and preferably, formed to be 13–30 mm larger than it. The side surface light tight member 124 is adhered to the end surface of the winding core 125 by emulsion adhesive agent or adhesive tape, or thermal adhesion. A portion larger than the outer diameter of the roll photosensitive material 122, which does not cover the end surface of the roll photosensitive material 122, that is an excessive peripheral portion d, is jointed to the end portion of the roll photosensitive material 122, and is bent along the outer peripheral surface of the light tight leader 123 which covers the outer peripheral surface of the roll photosensitive material 122, and is folded along the outer peripheral surface of the light tight leader 123, and closely jointed to the light tight leader 123. In this connection, the light tight leader 123 is jointed to the end portion of the roll photosensitive material 122 by the splice tape 128 and wound, and the end portion of the leader is prevented from loosing by the end tape 131, which is called the roll photosensitive material scroll 122A. The side surface light tight member 124 is required to have sufficient light tightness, bending property, assurance of no pinhole, and strength characteristic. Accordingly, it is preferable that the side surface light tight member 124 is formed of the material satisfying the following conditions: the elongation is less than 150% both in the longitudinal and lateral directions; tensile strength is less than 20 kg/cm; tearing strength is more than 20 g and less than 50 g; and both tensile strength and tearing strength are less than 60% with respect to the weaker direction in the direction of peripheral surface and width direction of the peripheral surface light tight leader, so that the bending property is made better; the tearing strength has approximate values both in longitudinal and lateral directions; and the adhered portion to the light tight leader 123 is easily torn. Concretely, a lamination layer sheet is appropriate in which light tight polyethylene film including aluminum foil, paper, and carbon black is laminated so that the total thickness is less than 200 μm. Further, a lamination sheet is more preferable in which more than 2 layers of aluminum foil and paper are laminated.

As described above, in the roll photosensitive material packing body 120 of the present example, the surplus peripheral portion d of the side surface light tight member 124 which is larger than the outer diameter of the roll photosensitive material 122, is bent along the outer peripheral surface of the roll photosensitive material scroll 122A and folded along the outer peripheral surface, and is closely adhered to the light tight leader 123, and thereby, slit formation on the side surface light tight flange can be omitted, and further, the light tightness is excellent. Accordingly, when the packing body 120 of the present invention is produced, various troublesome operations relating to slit formation can be omitted, and thereby, production cost can be reduced.

Further, there is no possibility of unanticipated leakage of light to the photosensitive material web caused by slit formation failure, or of breakage of the peripheral portion of the side surface light tight member 124, and therefore, high quality with positive light tightness can be realized.

Next, an example of production (assembly) of the roll photosensitive material packing body 120 of the above embodiment will be described.

Production of a belt-like photosensitive material roll is conducted as follows.

Figure 3:
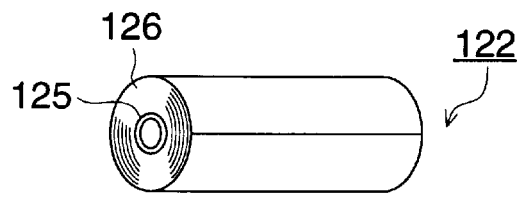
FIG. 3 is a perspective view of the roll photosensitive material used in the present invention.

In order to assemble the packing body 120 of the above embodiment, initially, the photosensitive material web 126 is wound around the cylindrical winding core 125 and wound up roll, and the roll photosensitive material 122 shown in FIG. 3 is produced. In this winding up operation, it is necessary to align the photosensitive material web 126 and uniformly wind up, and ideally, the length of the wound up roll photosensitive material 122 (the width direction of the photosensitive material web 126) is almost the same as the width of the photosensitive material web 126. However, in practice, the length is sometimes beyond the width of the photosensitive material web 126 by meandering at the winding up operation. In this case, the limit of the excessive length is 1.0 mm, and it is better that this limit is not exceeded.

Joint of the light tight leader is conducted as follows.

Figure 4:
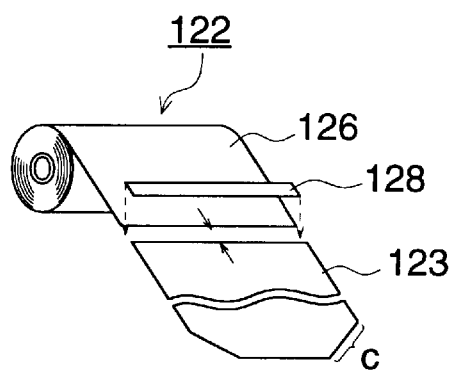
FIG. 4 is a partially exploded perspective view of the roll photosensitive material scroll used in the present invention.

Next, as shown in FIG. 4, one end whose width is the same as that of the photosensitive material web 126, of both ends of the light tight leader 123 is jointed to the end of the photosensitive material web 126 which is on the outer peripheral surface of the roll photosensitive material 122 produced by the above operation. The joint method is not specifically limited, but a commonly known butt splice joint method is preferable. In this connection, at the time of this butt splice joint, it is desirable that the jointed end of the photosensitive material web 126 and the jointed end of the light tight leader 123 are perpendicular to the direction of outer periphery of the roll photosensitive material 122, and each jointed surface is flat. However, when there is no gap between jointed end surfaces, each jointed surface may not be perpendicular to the outer peripheral direction, or each jointed surface may be mount type or wave type. Further, resin film may stand between both jointed surfaces, and may be thermally adhered.

Figure 5:
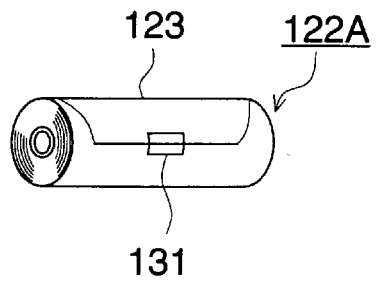
FIG. 5 is a perspective view showing an example of the roll photosensitive material scroll used in the present invention.

Further, other than the above description, a method in which the photosensitive material web and the light tight leader are superimposed and jointed, may be used. In this connection, at also the time of joint by this method, the shape of each joint end and the jointed surface of the photosensitive material web 126 and the light tight leader 123 is the same as that by the butt splice joint method. The width of superimposition can be arbitrarily determined and 1–100 mm is necessary, and specifically 5–20 mm is preferable. The relationship of upper and lower sides of the photosensitive material web 126 and the light tight leader 123 is not necessary to be specifically determined, and either one may be upper side. Further, as a fixing method, adhesive tape, ultrasonic wave adhesion, or thermal adhesion may be used, and in the case of fixing by the adhesive tape as the splice tape 128 as shown in FIG. 5, it is necessary that the tape is adhered at least to one surface of the jointed portion. Further, in the case of one surface adhesion, it is a condition that the tape is adhered to the outer end portion of the photosensitive material web 126 so that it is not caught by the slit portion of the magazine when passing through the slit portion. Further, in the case of fixing by the ultrasonic wave adhesion and the thermal adhesion, it is necessary that the outer end portion of the roll like photosensitive material 122 of the joint portion is hardly peeled.

Next, after the light tight leader 123 has been wound around the outer peripheral surface of the roll photosensitive material 122, the trailing end of the light tight leader 123 is adhered for preventing it from loosing by adhesive tape as re-peelable end tape 131 to the outer peripheral surface of the light tight leader 123 already wound around the roll photosensitive material 122, and as shown in FIG. 5, the roll photosensitive material scroll 122A whose outer peripheral surface is covered by the light tight leader 123, is produced. Further, the fixing by the end tape 131 may be appropriately conducted at one or a few portions corresponding to the width of the photosensitive material web 126 and light tight leader 123.

In this connection, it is ideal that the width of the light tight leader 123 which has been wound up, is the same as that of the photosensitive material web 126 (there is no slippage of winding), however, the width may somewhat exceed that of the photosensitive material web 126.

Fitting of thee side surface light tight member 124 is conducted as follows.

Figure 6:
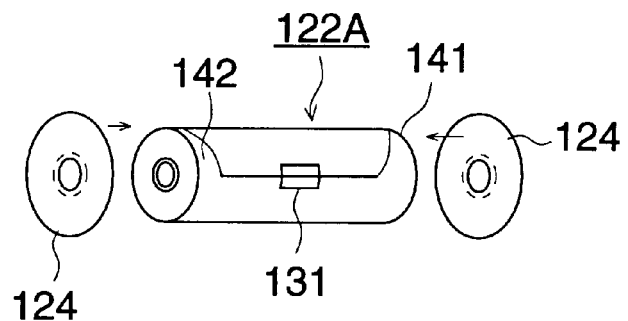
FIG. 6(a) is an exploded perspective view showing the structure of the roll photosensitive material scroll of the present invention.
FIG. 6(b) is an assembly perspective view.
Figure 6:
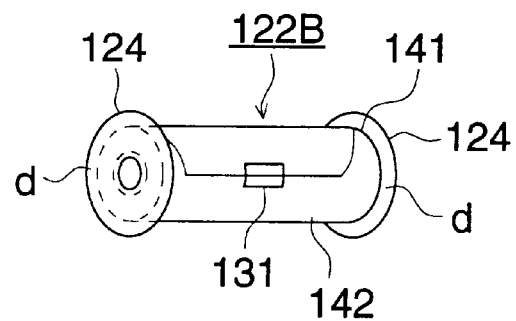

That is, a s show n in FIGS. 6(a) and 6(b), a donut-shaped side surface light tight members 124 are fitted to both end surfaces of the roll photosensitive material scroll 122A. At that time, the central hole of the winding core 125 positioned at the center of the side surface of the roll photosensitive material scroll 122A overlaps the hole formed at the central portion of the light tight member 124, and the circular side end surface of the winding core 125 is overlapped with one surface of the side surface light tight member 124 and the both surfaces of the overlapped portion are adhered. Accordingly, it is preferable that the end surface of the winding core 125 and the side surface light tight member 124 are concentric circles. As described above, the roll photosensitive material scroll 122B is produced.

The adhesion method of the both surfaces is not specifically limited, and various methods such as emulsion adhesive agent, thermal adhesion, adhesive tape, etc., may be used, however, emulsion adhesive agent is preferable.

Bending of the peripheral portion of the side surface light tight member and close adhesion of the bent portion 124A, 124B, 124C and 124D to the outer peripheral surface 142 of the light tight leader, at the outer peripheral edge portion 141 of the roll photosensitive material scroll 122A, to which the light tight leader is jointed and which is prevented from loosing by the end tape, are conducted as follows.

Figure 7:
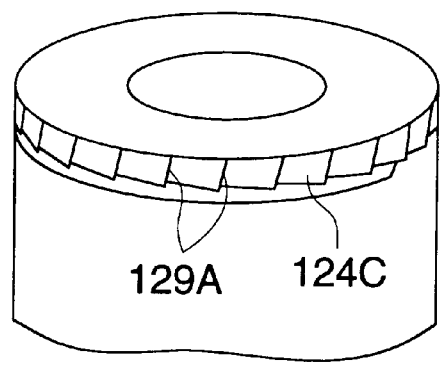
FIG. 7 is a partial perspective view showing an example of a practical use of the roll photosensitive material packing body of the present invention.
Figure 8:
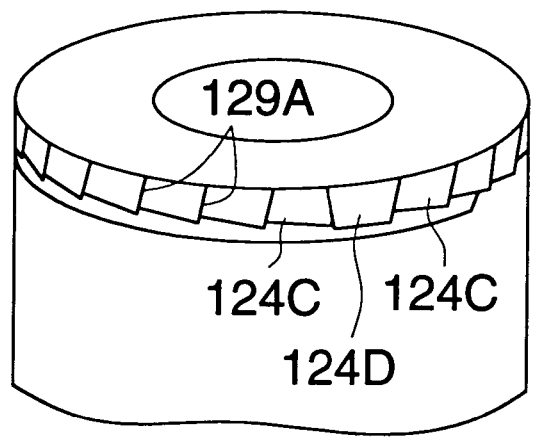
FIG. 8 is a partial perspective view showing another example of a practical use of the roll photosensitive material packing body of the present invention.
Figure 9:
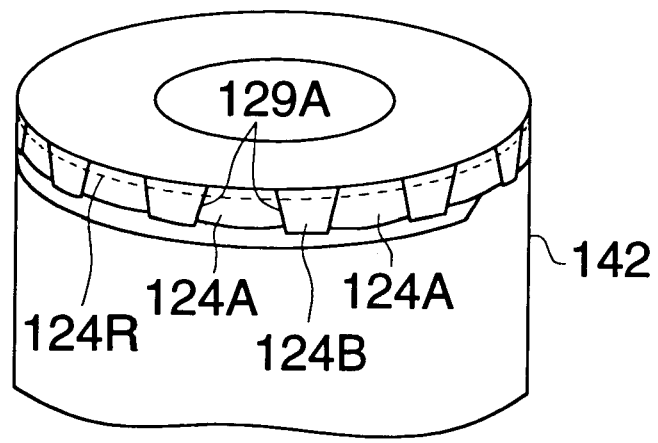
FIG. 9 is a partial perspective view showing still another example of a practical use of the roll photosensitive material packing body of the present invention.

That is, the shape of bent portion is shown by partial perspective views in FIGS. 7, 8 and 9.

In any of the above views, the portion of the range of d of the side surface light tight member is bent along the outer peripheral edge portion 141 of the roll photosensitive material scroll 122A so as to contact with the outer peripheral surface, at the pitch of approximately equal interval, while repeating the creases of the top and bottom. A condition of the crease is shown by partial development views in FIGS. 10(a) and 10(b).

FIG. 10(b) is a development view of the bent portion shown by the perspective view in FIG. 7, and the bent portion 124C is structured by sequentially forming the crease in the order of the peak and bottom, or the bottom and peak, which is an example of Item 2 shown in FIG. 7.

FIG. 10(a) is a development view of the bent portion shown by the perspective view in FIG. 9, and it can be found that the bent portions 124A and 124B are structured by forming the sequentially adjoining portions in the folded portions in the order of the bottom, peak, peak and bottom, or the peak, bottom, bottom and peak, on the outer peripheral surface of the roll photosensitive material scroll 122A. This corresponds to an example of Item 4.

The shape of the bent portion shown by the perspective view in FIG. 8 is just the same shape as that of an example of Item 2 shown in FIG. 7, except a portion of one pair of bent portions 124D. This is an example of Item 3. It can also be said that the shape in FIGS. 7 and 8 is determined depending on whether the number of pitches of the bent portion is even or odd number.

In any case, as shown in FIGS. 10(a) and 10(b), the crease of the bottom is shown by a dotted line, and the crease of the peak is shown by a solid line. When the crease 129A of the peak is folded around the crease 129B of the bottom and laid, the inclination angle β formed between the direction of the crease of the peak and the direction of the axis of the scroll is smaller than the inclination angle α formed between the direction of the crease of the bottom and the direction of the axis of the scroll. Thereby, a portion along the crease of the bottom is adhered by the adhesive agent of the side surface light tight member, and however a portion G is not adhered because it is not the adhesive surface, a portion H is adhered to the outer peripheral surface by the adhesive agent. Accordingly, there is no possibility that light enters into the inside along the crease.

As described above, in the example of Item 1 including examples of Items 2, 3 and 4, a condition of packing body having excellent light tightness can be realized.

Next, an example of Item 4 will be described relatively in detail.

Figure 10:
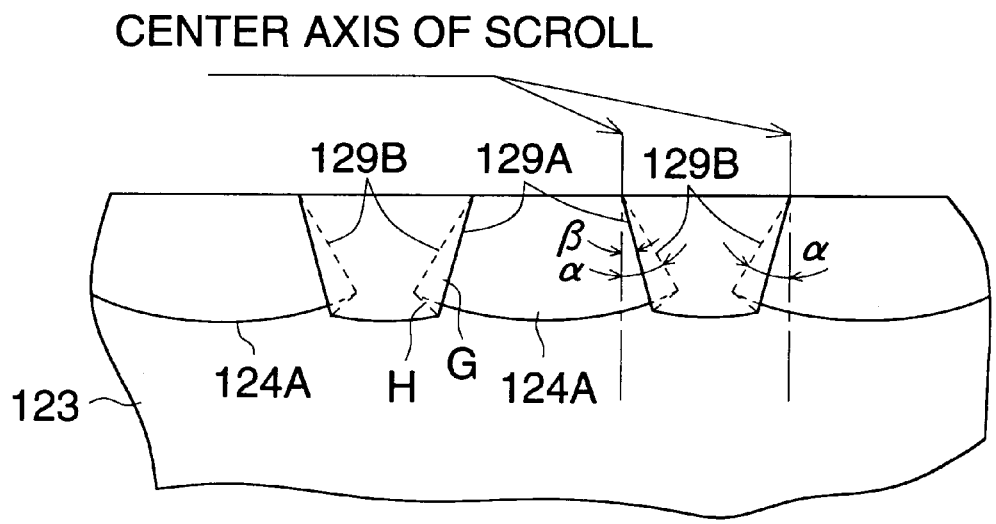
FIGS. 10(a) and 10(b) are partial development views showing a bending condition with of a side surface light tight member with respect to the outer peripheral surface of a scroll.
Figure 10:
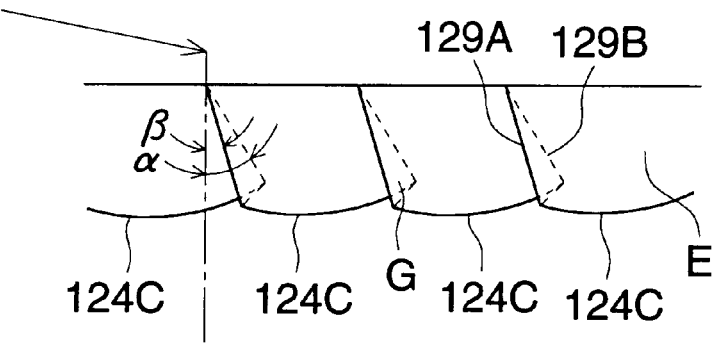

As shown by a perspective view in FIG. 9, and a partial development view in FIG. 10(*a*), a peripheral end portion d (shown in FIG. 6) of the side surface light tight member 124 is bent so as to contact with the outer peripheral surface, along the outer peripheral edge portion 141 of the roll photosensitive material scroll 122A. The peripheral end portion d to be initially bent, is a portion expressed by numeral 124A, and as shown in the drawing, the portion 124A is bent alternately so as to intermittently adhered closely to the outer peripheral surface 142 of the peripheral surface light tight leader 123, at a pitch of approximately equal interval of 5–20 mm with respect to the length of the outer peripheral edge portion 141 of the roll photosensitive material scroll 122A. Further, a portion expressed by numeral 124B which is not yet bent, except a portion of 124A in the peripheral end portion d to be bent is on the condition of rising, and after it is further bent as shown by FIG. 9, it is folded so that it is superimposed on the portion 124A which has been initially bent, and the roll photosensitive material packing body 120 to which the side surface light tight members 124 are fitted, is produced. As described above, as a bending condition of the side surface light tight member 124, it is desirable that the surplus portion d on the peripheral surface is formed into bent portions 124A and 124B at an approximately equal pitch, and the creases 129A and 129B of the peak and bottom formed by superimposing the bent portions have angles $\alpha$, $\beta(\alpha>\beta)$ of 20–70° with respect to the central axis of the winding core 125 at the outer peripheral surface 142 of the scroll 122A. Thereby, a sufficient adhesion area of the outer periphery of the scroll and the side surface light tight member at the folded portion can be obtained, and the folded portion is prevented from rising. Further, the creases has inclination of 20–70°, and therefore, no light beam directly enters toward the photosensitive surface from the opening portion of the creases, so that the photosensitive material is not fogged by the light beam.

As a close adhesion method, the emulsion adhesion is preferable, however, it is not limited to that method, and for example, thermal adhesive agent can also be used.

When thermal adhesion is used, in the case where the side surface light tight member 124 is structured such that the thermoplastic resin layer exists on only the inside surface of the side surface light tight member 124, it adheres well to the peripheral surface light tight leader 123 by bending it, and a portion G shown in FIG. 10(*a*) in which outer side surfaces of the side surface light tight member 124 are superimposed on each other, is also almost closely adhered.

In the case where the side surface light tight member 124 is structured such that the thermoplastic resin layer exists on both surfaces of the side surface light tight member 124, it adheres well to the peripheral surface light tight leader 123 as shown in FIG. 10(*a*) by bending it, and a portion G in which outer side surfaces of the side surface light tight member 124 are superimposed on each other, is also adhered.

As described above, it is desirable that the portion G is also adhered by the both surface thermoplastic resin, however, even if the portion G is not adhered by the single surface thermoplastic resin, the portion H is adhered without fail, and therefore, the portion G is almost closely adhered, so that the light beam can be shielded.

In this connection, the roll photosensitive material packing body 120 is formed by using a component in which a rear padding member 124R, whose outer diameter is larger than that of the roll photosensitive material scroll 122A and is smaller than that of the side surface light tight member 124, is provided concentrically with the side surface light tight member 124 and is adhered to the rear side of the side surface light tight member 124. A perspective view of this process is shown, for example, in FIG. 9. An external line of backing paper 124R is shown by a dotted line in FIG. 9. When a light tight material is used as the rear padding member 124R, the light tightness is more increased than in the case of single side surface light tight member 124. In this case, the outer diameter of the rear padding member 124R is larger than that of the scroll, and therefore, even when the adhesive agent is coated on the rear of the rear padding member 124R as a label, the adhesive agent is not adhered to the photosensitive film.

Herein, when aluminum evaporation layer is provided as a material of the side surface light tight member, moisture resistivity is satisfactory, and it is excellent as the film package. When, as the material of the side surface light tight member, biaxial stretching polyester resin material or a material having a layer of synthetic paper with biaxial stretching layer is used, the side surface light tight portion is finely separated at the edge portion of the scroll when the leader is unwound at the time of loading into the magazine.

As described above, the roll photosensitive material packing body 120 of an example of the present embodiment can be produced through the above described series of processes.

Next, processes of formation of the bending portions 124A and 124B will be described using partial perspective views FIGS. 11(*a*), 12(*a*), 13(*a*) and partial front views FIG. 11(*b*), 12(*b*), and 13(*b*).

Figure 11:
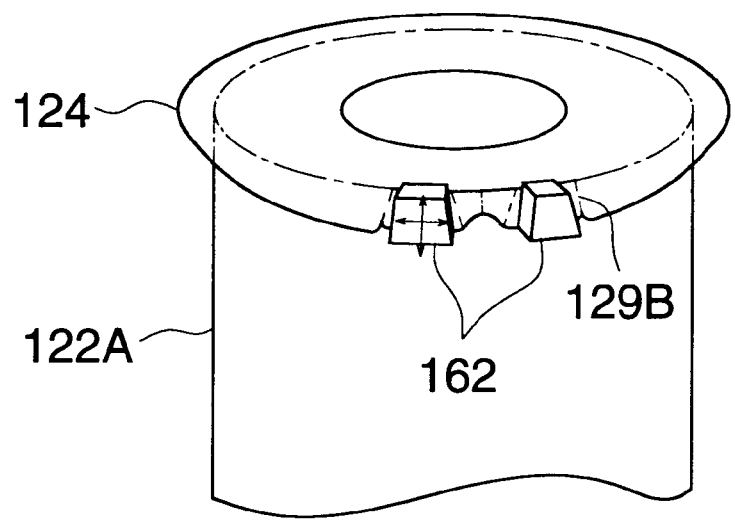
FIG. 11(a) is a partial perspective view showing an example of a process of a production method of the roll photosensitive material packing body of the present invention.
FIG. 11(b) is its partial front view.
Figure 11:
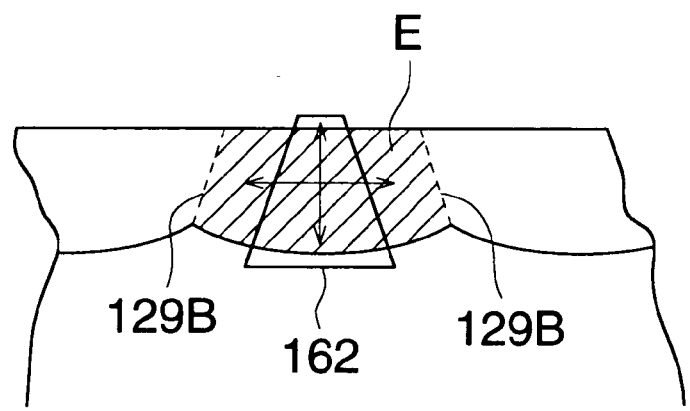

The bending portion 124A is bent by, for example, 2 first blocks 162 positioned at equal interval, and adhered to the outer peripheral surface of the light tight leader of the scroll by the adhesive agent coated on the rear surface of the side surface light tight member 124 as a hatched surface E shown in FIG. 11(*b*). Then, the crease of the bottom (bottom) 129B appears as a border line with the portion of the side surface light tight member 124 rising between both blocks.

Figure 12:
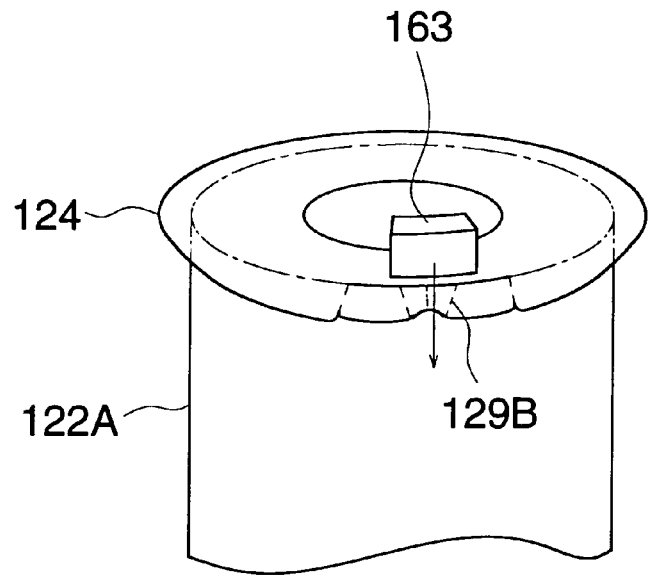
FIG. 12(a) is a partial perspective view showing another example of a process of a production method of the roll photosensitive material packing body of the present invention.
FIG. 12(b) is its partial front view.
Figure 12:
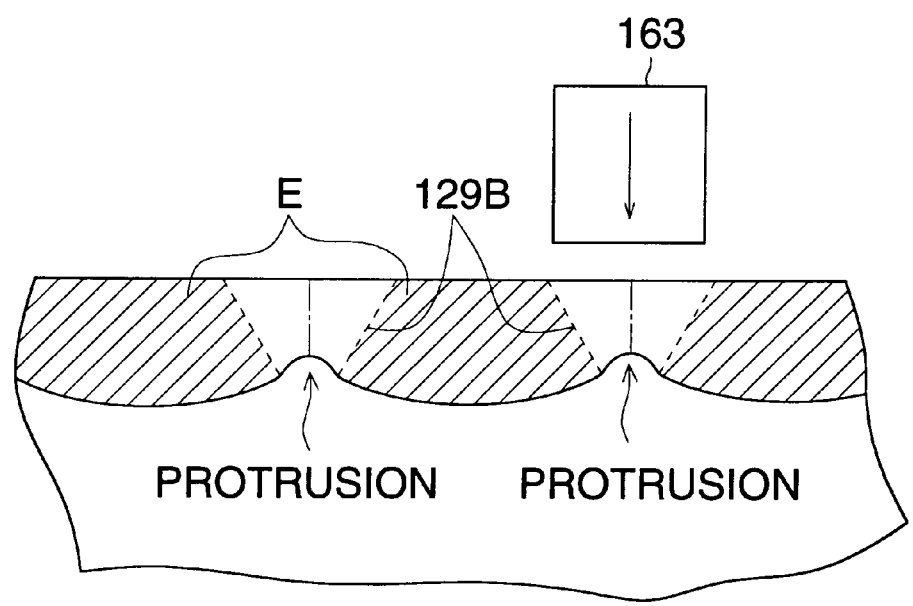
Figure 13:
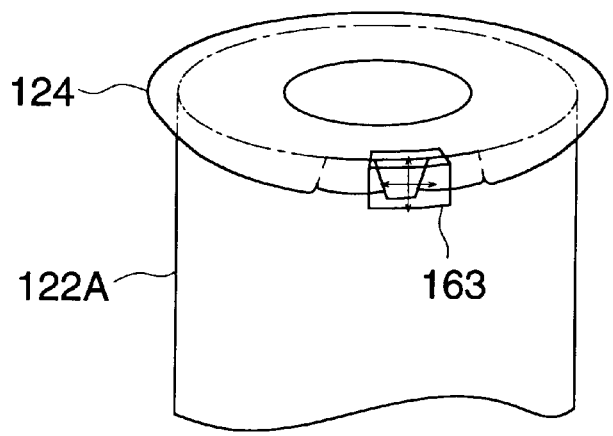
FIG. 13(a) is a partial perspective view showing still another example of a process of a production method of the roll photosensitive material packing body of the present invention.
FIG. 13(b) is its partial front view.
Figure 13:
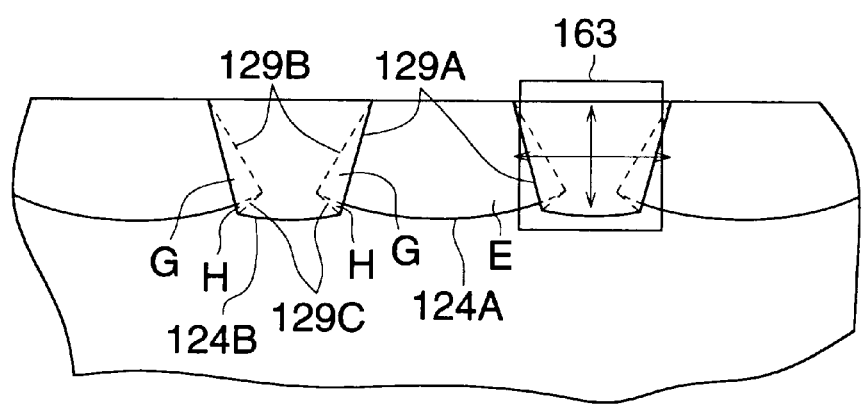

As shown in FIG. 12, the second block 163 is placed on a portion of the rising side surface light tight member 124, thereby, while the crease (bottom) is contrasted with the crease 129B portion, it is folded on the bending portion 124A formed by the first block 162, and bending portion 124B is formed as shown in FIG. 13(*a*) and 13(*b*), and a new crease (peak) 129A is formed and the bending portion 124B is formed.

At that time, when areas G, E and H among the creases 129B, 129A and the new crease 129C are observed, E and H are portions adhered by, for example, an adhesive agent of the rear surface, however, the portion G is a fold of surfaces on which an adhesive agent is not coated, so that these surfaces are not adhered. However, the portion H is covered and adhered, thereby, there is no possibility of leakage of light, and each bending portion is safely and nicely bent, so that an assured packing condition in which light tightness is assured, can be realized.

An effective process of the above-described operations will be described below.

More concrete forming method of the bending portions 124A and 124B are as follows.

Figure 14:
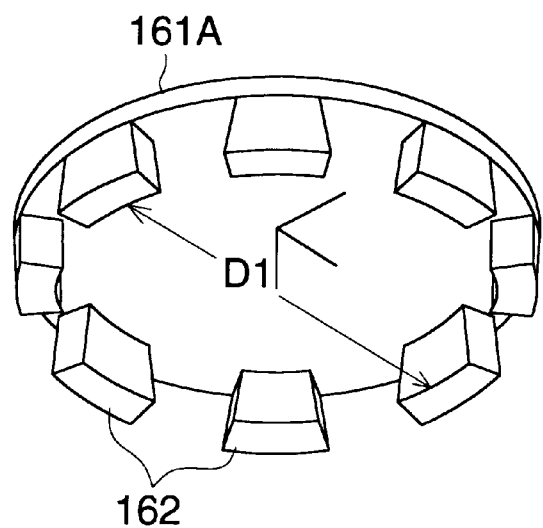
FIG. 14 is a perspective view showing a bending method of the first stage of the side surface light tight member with respect to the roll photosensitive material scroll of the present invention.

Relating to bending of the first bending portion 124A of the peripheral portion d of the side surface light tight member 124 or the side surface light tight member 124 to which the rear padding member 124R is adhered, as shown by the perspective view in FIG. 14, the first blocks 162 for bending are fitted to the first cylindrical body 161A at a predetermined pitch; the inner surface of the collective body of the first blocks 162 is structured such that it form a portion of the cylindrical inner surface, and its inner diameter D1 is almost equal to the outer diameter of the outer peripheral surface 142 of the light tight leader 123 of the roll photosensitive material scroll 122B; and the first cylindrical body 161A is lowered along the outer diameter D of the outer peripheral surface 142 of the roll photosensitive material scroll 122B. Thereby, the first bending portion 124A covers on the outer peripheral surface 142.

Figure 15:
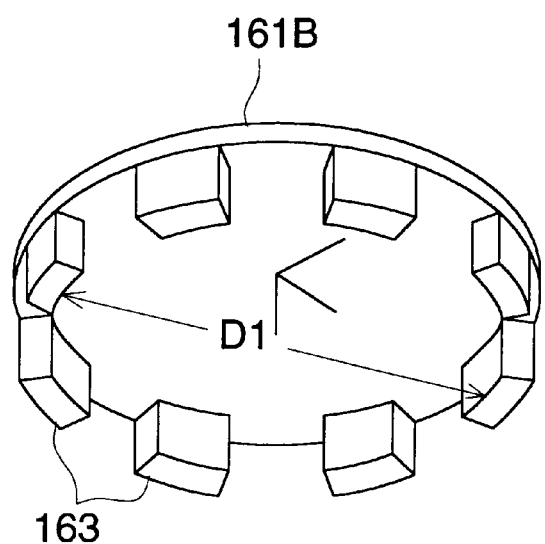
FIG. 15 is a perspective view showing a bending method of the second stage of the side surface light tight member with respect to the roll photosensitive material scroll of the present invention.

Relating to bending of the second bending portion 124B, as shown by the perspective view in FIG. 15, the second blocks 163 for bending are fitted to the second cylindrical body 161B at a predetermined pitch; the inner surface of the collective body of the second blocks 163 is structured such that it form a portion of the cylindrical inner surface, and its inner diameter D1 is almost equal to the outer diameter of the outer peripheral surface 142 of the roll photosensitive material scroll 122B; and it is operated in the same manner as in the case of the first cylindrical body 161A as shown by a perspective view in FIG. 9, and a portion of the second bending portion 124B is superimposed on the already bent first bending portion 124A, and covers it. When a heat source is arranged on the cylindrical body, thermoplastic resin on the surface of the light tight leader 123 and the rear surface of the side surface light tight plate 124 is heated, thereby, adhesion can be completed.

Further, after the first bending portion 124A is formed by the first cylindrical body 161a alone to which the fist blocks 162 as shown in FIG. 14 are fitted, it is returned upward; the disk 161A is rotated by ½ pitch and reset, and lowered again; and the second bending portion 124B can be formed and superimposed. In the same manner, the second cylindrical body 161B alone can bend both bending portions.

Figure 16:
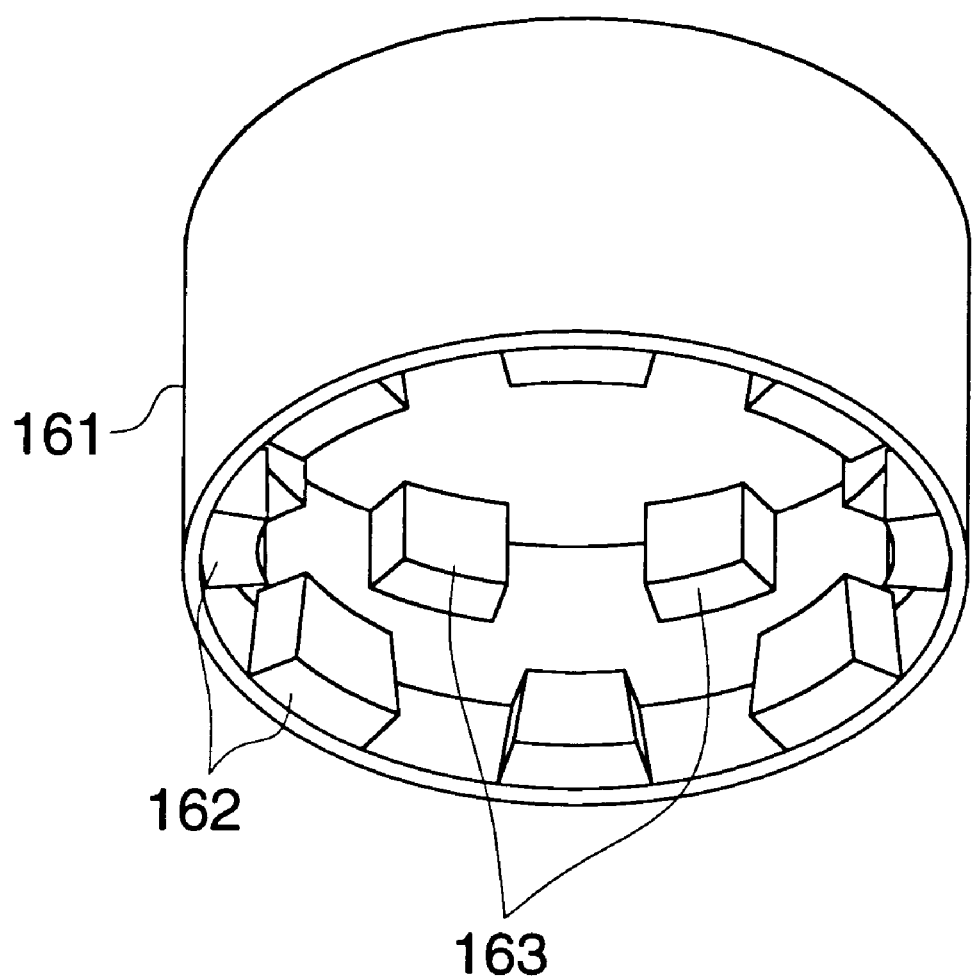
FIG. 16 is a perspective view showing a method by which bending of the side surface light tight member on the first and second stages is conducted at a time, with respect to the roll photosensitive material scroll of the present invention.

In the cylindrical body 161 shown by a perspective view in FIG. 16, the block 162 for the first bending portion 124A and the block 163 for the second bending portion 124B are shifted each other by 1 pitch and arranged vertically, thereby the first and the second bending portions 124A and 124B are completed by one operation.

Next, a mode of the use of the roll photosensitive material packing body 120 of an example of the present embodiment will be described.

When thus produced packing body 120 is loaded in the magazine 150 as shown by a perspective view in FIG. 18(a), initially, the end tape 131 adhered to the leading edge of the light tight leader 123 is peeled as shown in FIG. 18(b), and the leading edge of the light tight leader 123 is under the condition of free.

Then, after the leading edge of the light tight leader 123 is pushed outside from the opening portion 152 which is light shielded by velvet of the magazine 150, the cover of the magazine is tightly closed as shown in FIG. 18(c) and the inside of the magazine 150 is light shielded.

Next, when the leading edge of the light tight leader 123 which comes outside from the opening portion 152 of the magazine 150 as shown by a perspective view in FIG. 18(d), is pulled outside, initially, the light tight leader 123 begins to come loose from the roll photosensitive material scroll 122B, then, the pulling force of the leading edge of the light tight leader 123 has a resistance at a portion at which the width reducing portion c of the leading edge of the light tight leader 123 is adhered to the peripheral portion d of the side surface light tight member 124.

Figure 17:
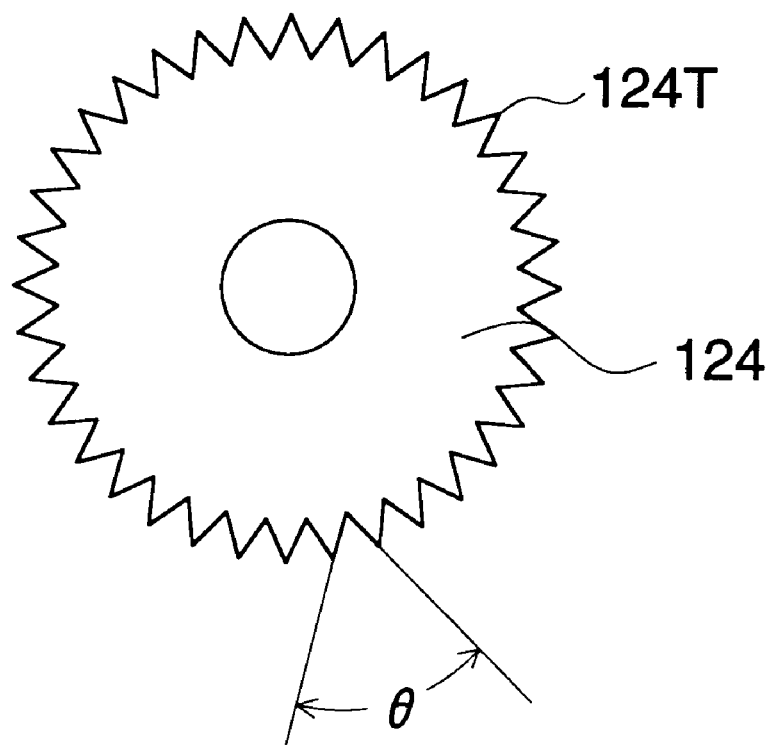
FIG. 17 is a plan view showing the shape of an example of thee side surface light tight member used in the present invention.
Figure 19:
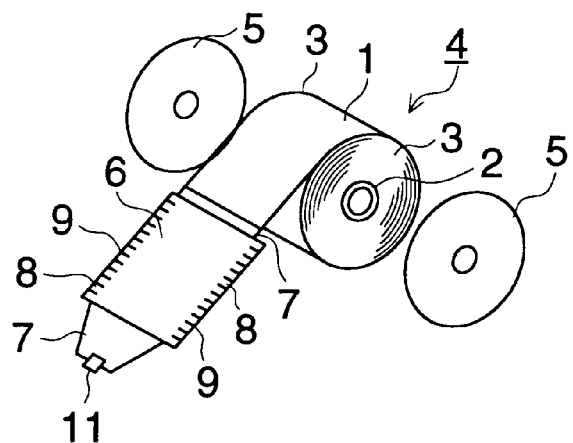
FIGS. 19(a) and 19(b) are exploded perspective views and an assembly perspective view showing an example of the conventional roll photosensitive material packing body.
Figure 19:
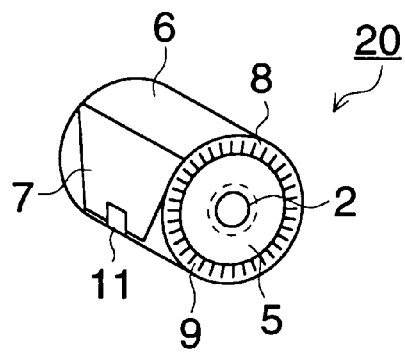
Figure 20:
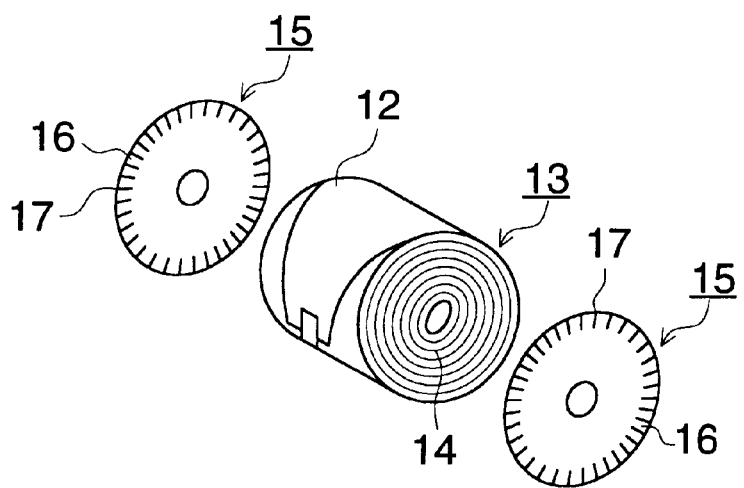
FIGS. 20(a) and 20(b) are exploded perspective views and an assembly perspective view showing another example of the conventional roll photosensitive material packing body.
Figure 20:
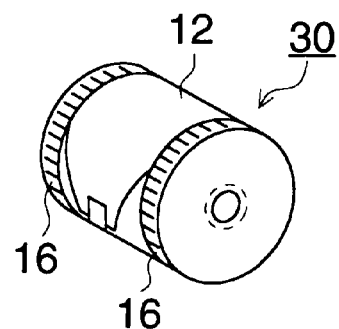
Figure 21:
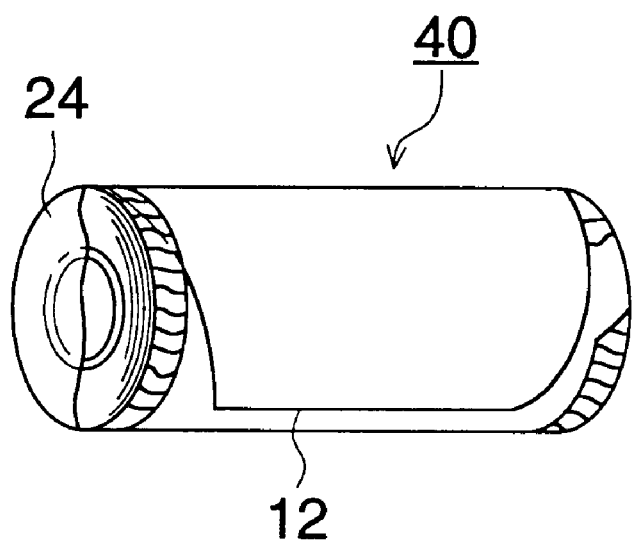
FIG. 21 is an assembly perspective view showing still another example of the conventional roll photosensitive material packing body.

When the leading edge is further pulled out, the side surface light tight member 124 begins to be broken at both side edge portions of the light tight leader 123 in also a portion the light tight leader 123 is adhered to the peripheral portion d of the side surface light tight member 124. At that time, as shown by a plan view in FIG. 17, gear-like notches 124T are provided on the outer peripheral portion of the side surface light tight member, and when an angle θ formed by the peak and peak of the notches with respect to the bottom is 5–90°, the breakage can be smoothly conducted.

As shown by a perspective view in FIG. 18(d), in succession, the side edge portion of the light tight leader 123 cuts the peripheral edge portion d of the side surface light tight member 124 from a portion at which the width reducing portion c of the light tight leader 123 ends.

Then, when the side edge portion of the light tight leader 123 cuts the peripheral edge portion d of the side surface light tight member 124 by one round, the adhered portion of the light tight leader 123 and the peripheral edge portion d of the side surface light tight member 124 ends, and after that, the light tight leader 123 normally comes loose.

When a joint portion of one end of the side surface light tight leader 123 and the other end of the photosensitive material web 126 is pulled out outside the magazine 150 for unwinding, the pulling out of the light tight leader 123 is stopped at that time.

When a splice tape 128 which joints the light tight leader 123 to the photosensitive material web 126 is peeled, or the photosensitive material web 126 is cut outside the magazine, and the light tight leader 123 is separated from the photosensitive material web 126, a condition shown in FIG. 18(e) is obtained.

By above operations, disassemble of the bright room loading package is completed, and the magazine which has housed the roll photosensitive material packing body, is equipped in printers or the similar devices and is used. In this connection, the side surface light tight plates 124 attached to both side end surfaces of the roll photosensitive material packing body 120 remain to be attached there until the roll photosensitive material 122 is thoroughly consumed.

As described above, in the roll photosensitive material packing body of the present invention, the side surface light tight member is structured such that the outer diameter of the side surface light tight member is larger than that of the roll photosensitive material scroll, and a portion lager than the outer diameter of the roll photosensitive material scroll is bent along the outer peripheral surface at the outer peripheral edge portion of the roll photosensitive material scroll; the surplus portion on the outer peripheral surface of the roll photosensitive material scroll is folded at plural portions and covers the portions; and folded portions are composed of creases of peaks and bottoms, and the crease of the peak is laid on the upper side of the crease of the bottom and folded on it, and the folded portions are provided on the outer peripheral surface of the roll photosensitive material scroll at almost equal interval; the direction of the crease of the bottom has an inclination with respect to the direction of the winding core axis; and the crease of the peak is laid in the direction reverse to the direction of the inclination with respect to the direction of the winding core axis. Thereby, the leakage of light at the folded portion can be prevented, and a high quality packing method with safe and assured light tightness can be provided.

Further, by adding the backing paper to the side surface light tight member, more positive light tightness can be obtained, and adhesion of the side surface light tight member to the roll end surface can be prevented, thereby, the photosensitive material is not bad influenced.

Further, the first block to bend a portion of the side surface light tight member whose outer diameter is larger than that of the roll photosensitive material scroll, along the outer peripheral surface at the edge portion of the outer periphery of the roll photosensitive material scroll, is arranged, and when the first block is moved along the outer peripheral surface of the roll photosensitive material scroll in the direction of the winding core axis or in the direction of outer peripheral surface of the roll photosensitive material scroll, a crease cover portion is formed between 2 bottoms; the second block is arranged so that no-adhered portions which exist between crease cover portions and have an equal interval, are bent; and when the second block is moved in the direction of the winding core axis or in the direction of outer peripheral surface of the roll photosensitive material scroll in the same manner as the first block, a crease cover portion is formed between 2 peaks of the side surface light tight member. Thereby, the quality of the roll photosensitive material packing body structured as described above, is stabilized, and the packing body can be easily produced, and a low production cost can be attained.

What is claimed is:

1. A roll photosensitive material package, comprising:
   a roll photosensitive material scroll comprising
      a core,
      a roll photosensitive material wound around the core, and
      a light shielding leader connected to a leading end of the roll photosensitive material and wound around the roll photosensitive material so as to shield an outer circumferential surface of the roll photosensitive material from light; and
   a light shielding side member provided to each side of the roll photosensitive material scroll so as to shield each side of the roll photosensitive material from light and fixed substantially coaxially to the core,
   wherein an outer diameter of the light shielding side member is larger than that of the roll photosensitive material scroll so that the light shielding side member has a surplus portion projecting from the outer circumferential surface of the roll photosensitive material scroll, and the surplus portion is bent at the edge of the outer circumferential surface, folded at plural points and superimposed on the outer circumferential surface,
   wherein the folded superimposed sections of the surplus portion are composed of peak creases and bottom creases, the peak creases are superimposed around the bottom creases and the folded superimposed sections are provided with a substantially equal pitch, and
   wherein a direction of each bottom crease has an inclination angle $\alpha$ to the axis of the core, when the peak creases are superimposed around the bottom creases, a direction of each peak crease has an inclination angle $\beta$ to the axis of the core, and the inclination angle $\beta$ is smaller than the inclination angle $\alpha$.

2. The roll photosensitive material package of claim 1, wherein the folded superimposed sections on the outer circumferential surface of the roll photosensitive material scroll are sequentially structured with the order of a bottom crease and a peak crease or with the order of a peak crease and a bottom crease.

3. The roll photosensitive material package of claim 1, wherein the folded superimposed sections except one folded superimposed section on the outer circumferential surface of the roll photosensitive material scroll are sequentially structured with the order of a bottom crease and a peak crease or with the order of a peak crease and a bottom crease and the exceptional one folded superimposed section is structured with the reverse order of a peak crease and a bottom crease or the reverse order of a bottom crease and a peak crease.

4. The roll photosensitive material package of claim 1, wherein the folded superimposed sections on the outer circumferential surface of the roll photosensitive material scroll are sequentially structured with the order of a bottom crease, a peak crease, a peak crease and a bottom crease or with the order of a peak crease, a bottom crease, a bottom crease and a peak crease.

5. The roll photosensitive material package of claim 1, wherein the inclination angle $\alpha$ is 20° C. to 70° C.

6. The roll photosensitive material package of claim 1, wherein the light shielding side member comprises a label member having an adhesive layer and an outer diameter larger than that of the roll photosensitive material scroll, a back padding member having an outer diameter larger than that of the roll photosensitive material scroll and smaller than that of the label member, and wherein the light shielding side member is structured by pasting the label member and the back padding member.

7. The roll photosensitive material package of claim 1, wherein the light shielding side member comprises an aluminum deposition layer.

8. The roll photosensitive material package of claim 1, wherein the light shielding side member comprises a layer made of a biaxially stretched polyester resin material.

9. The roll photosensitive material package of claim 1, wherein the light shielding side member comprises a layer made of a synthetic paper having a biaxially stretched layer.

10. The roll photosensitive material package of claim 1 wherein a plurality of notches is provided on said winding core adjacent said side surface light tight member.

11. The roll sensitive material package of claim 10 wherein angles $\theta$ between adjacent sides of said notches is 5° to 90°.

* * * * *